(12) United States Patent
Claxton et al.

(10) Patent No.: US 12,394,079 B2
(45) Date of Patent: Aug. 19, 2025

(54) IMAGE FEATURE MEASUREMENT

(71) Applicant: BRITISH TELECOMMUNICATIONS PUBLIC LIMITED COMPANY, London (GB)

(72) Inventors: Robert Claxton, London (GB); Michael Free, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 351 days.

(21) Appl. No.: 17/912,810

(22) PCT Filed: Mar. 9, 2021

(86) PCT No.: PCT/EP2021/055865
§ 371 (c)(1),
(2) Date: Sep. 19, 2022

(87) PCT Pub. No.: WO2021/185629
PCT Pub. Date: Sep. 23, 2021

(65) Prior Publication Data
US 2023/0154028 A1 May 18, 2023

(30) Foreign Application Priority Data

Mar. 20, 2020 (EP) .................................... 20164709
Mar. 20, 2020 (GB) .................................... 2004103

(51) Int. Cl.
*G06T 7/60* (2017.01)
*G06V 10/764* (2022.01)
*G06V 10/772* (2022.01)

(52) U.S. Cl.
CPC .............. *G06T 7/60* (2013.01); *G06V 10/764* (2022.01); *G06V 10/772* (2022.01)

(58) Field of Classification Search
CPC ... G06T 7/62; G06T 7/60; G06T 2207/10024; G06T 2207/30164; G06V 10/772; G06V 10/764
See application file for complete search history.

(56) References Cited

U.S. PATENT DOCUMENTS 9,574,871 B2 2/2017 Choi
9,691,163 B2 6/2017 Wexler et al.
(Continued)

FOREIGN PATENT DOCUMENTS

CN 109059763 12/2018
EP 3 151 197 4/2017
(Continued)

OTHER PUBLICATIONS

Antonio Criminisi, et al., "Single-View Metrology: Algorithms and Applications (Invited Paper)", In: "Pattern Recognition", Springer Berlin Heidelberg, Berlin, Heidelberg, vol. 2449, Oct. 10, 2002, pp. 224-239 (16 pages).

(Continued)

*Primary Examiner* — Congvan Tran
(74) *Attorney, Agent, or Firm* — Nixon & Vanderhye P.C.

(57) ABSTRACT

A computer implemented method for determining a physical size of a feature represented in an image is provided together with computer systems and programs for carrying out the method. The method receives initial data comprising an indication of a respective physical size of one or more known types of object. The method uses the initial data to generate reference data from a first reference image. The generated reference data comprises an indication of a respective inferred physical size of one or more reference types of object. The method uses the generated reference data to determine the physical size of the feature based, at least in part, on: a size of a representation of one of the reference types of object in the image; the inferred physical size of that reference type of object; and a size of the representation of the feature in the image.

21 Claims, 9 Drawing Sheets

(56) References Cited

U.S. PATENT DOCUMENTS

| | | | |
|---|---|---|---|
| 10,055,851 B2 | 8/2018 | Spector et al. | |
| 2002/0107874 A1* | 8/2002 | DeLorme | G06F 16/10 |
| 2005/0109850 A1* | 5/2005 | Jones | B42D 25/42 |
| | | | 235/487 |
| 2008/0284900 A1* | 11/2008 | Abe | G03B 3/00 |
| | | | 348/E5.042 |
| 2012/0013604 A1* | 1/2012 | Kang | H04N 13/296 |
| | | | 345/419 |
| 2012/0224052 A1 | 9/2012 | Bae | |
| 2013/0058560 A1* | 3/2013 | Sobczak | G06T 7/62 |
| | | | 382/152 |
| 2016/0104299 A1 | 4/2016 | George | |
| 2018/0164434 A1* | 6/2018 | Stokes | G01S 7/6263 |
| 2021/0342584 A1* | 11/2021 | Sato | G06T 7/246 |

FOREIGN PATENT DOCUMENTS

| | | |
|---|---|---|
| JP | 2017-211691 | 11/2017 |
| KR | 10-1822571 | 1/2018 |
| WO | 2017/211726 | 12/2017 |
| WO | 2018/055254 | 3/2018 |

OTHER PUBLICATIONS

Ondrej Kainz, et al., "Estimating the Object Size from Static 2D Image", 2015 International Conference and Workshop on Computing and Communication (IEMCON), Oct. 15-17, 2015, 5 pages.

Jonathan Long, et al., "Fully convolutional Networks for Semantic Segmentation", 2015 IEEE Conference on Computer Vision and Pattern Recognition (CVPR), Jun. 7-12, 2015, 10 pages.

Adrian Rosebrock, "Measuring size of objects in an image with OpenCV", PyImageSearch, Mar. 28, 2016, 89 pages, https://www.pyimagesearch.com/2016/03/28/measuring-size-of-objects-in-an-iamge-with-opencv/.

Extended European Search Report for EP Application No. 20164709.6 dated Aug. 17, 2020, 9 pages.

Search Report for GB Application No. 2004103.4 dated Sep. 1, 2020, 4 pages.

International Search Report and Written Opinion of the ISA for PCT/EP2021/055865 dated Apr. 22, 2021, 12 pages.

International Preliminary Report on Patentability dated Sep. 29, 2022 issued for International Application No. PCT/EP2021/055865 (8 pages).

Communication pursuant to Article 94(3) EPC dated Nov. 8, 2024, issued for European Application No. 21 709 700.5 (7 pages).

* cited by examiner

IMAGE FEATURE MEASUREMENT

CROSS-REFERENCE TO RELATED APPLICATIONS

This application is the U.S. national phase of International Application No. PCT/EP2021/055865 filed Mar. 9, 2021 which designated the U.S. and claims priority to EP Patent Application No. 20164709.6 filed Mar. 20, 2020, and GB Patent Application No. 2004103.4 filed Mar. 20, 2020, the entire contents of each of which are hereby incorporated by reference.

FIELD OF THE INVENTION

The present invention relates to a method for determining a physical size of a feature represented in an image.

BACKGROUND TO THE INVENTION

Being able to determine the physical size of a feature represented in an image, that is to say the actual size of the feature in the real world, as measured, for example, in meters or inches, rather than its virtual size in the image, as measured, for example, in pixels, is useful for a wide range of applications.

Existing methods for determining the physical size of features in images typically require a specific pre-defined reference object of known physical size to be included in the image. Such methods can then attempt to find the pre-determined reference feature in an image and use the known size of the reference feature to infer the size of other objects in the image. For example, U.S. Pat. No. 9,691,163 B2 discloses a system and method which requires a reference object displaying known fiducial patterns to be included in an image for the purposes of measuring a target object in the image.

Other known methods for determining the physical size of features in images require the equipment that is used to capture the image to be pre-calibrated to provide additional metadata for the image that can be used for calculating the size of the features in the images. For example, US 2012/0224052 A1 discloses a method for measuring the real size of an object in which the image-capture equipment additionally records a focus distance and uses a distance sensor to measure the distance between the camera and an object in the image. This additional information is then used in determining a physical size of the object from its representation in the image.

SUMMARY OF THE INVENTION

According to a first aspect of the invention, there is provided a computer implemented method for determining a physical size of a feature represented in an image, the method comprising: receiving initial data comprising data for identifying one or more known types of object and an indication of a respective physical size of each of the one or more known types of object; generating reference data from a first reference image by identifying one or more new types of object represented in the first reference image and using the initial data to infer a respective physical size of each of the one or more new types of object, the one or more new types of object forming one or more reference types of object for determining the physical size of the feature; and using the reference data to determine the physical size of the feature based, at least in part, on: a size of a representation of one of the reference types of object in the image; the inferred physical size of that reference type of object; and a size of the representation of the feature in the image.

The reference data may be generated by directly inferring a physical size of at least one of the reference types of object from a respective one of the known types of object. The physical size may be directly inferred based on: a size of a representation of the reference type of object in the first reference image; a size of a representation of the known type of object in the first reference image; and the physical size of the known type of object as indicated by the initial data.

The first reference image may be one of a set of reference images, in which case the reference data may be generated from the reference data indirectly by inferring a physical size of at least one of the reference types of object from a respective one of the known types of object based on: a size of a representation of the reference type of object in the first reference image; a size of a representation of an intermediate type of object in the first reference image; a size of a representation of the intermediate type of object in a second image of the set of reference images; a size of a representation of the known type of object in the second image; and the physical size of the known type of object as indicated by the initial data.

Generating the reference data may comprise determining a respective plurality of candidate physical sizes for at least one of the reference types of object and determining a respective inferred physical size for the reference type of object based on the plurality of candidate physical sizes. The plurality of the respective candidate physical sizes for the reference type of object may be inferred from different representations of a known type of object. The respective plurality of candidate physical sizes comprise at least one directly inferred physical size and at least one indirectly inferred physical size. A plurality of respective candidate physical sizes may be indirectly inferred from the same representation of a known type of object based on different representations of the intermediate type of object in either the first reference image, the second reference image, or both the first and second reference image. A plurality of respective candidate physical sizes may be indirectly inferred from the same representation of a known type of object based on representations of different intermediate types of object in the first and second reference images. Where the initial data comprises an indication of a respective physical size of a plurality of known types of object, a plurality of the respective candidate physical sizes may be inferred either directly or indirectly from respective representations of each of the plurality of known types of object.

The inferred physical size of the one or more reference types of object comprises an indication of a range of physical sizes and the determined physical size of the feature may comprise an indication of a range of physical sizes.

A confidence with the inferred physical size may be determined for each of the one or more reference types and an indication of a respective confidence in the inferred physical size of the feature may be provided.

The reference data may be generated iteratively from the reference images. Each subsequent iteration may either increases the number of reference type of objects in the reference data or refines the inferred physical sizes for one or more reference type of objects in the reference data, or both.

The image may be stored as a reference image to be used in determining a physical size of a feature represented in a further image.

The determined physical size of the feature may be used to determine a physical interaction with an object represented in the image. The determination may be a determination of a quantity, or type, or both, of equipment to be installed in a telecommunications cabinet.

According to a second aspect of the invention, there is provided a computer system comprising a processor and a memory storing computer program code for performing the steps of a method according to the first aspect.

According to a third aspect of the invention, there is provided a computer program which, when executed by one or more processors, is arranged to carry out a method according to the first aspect.

BRIEF DESCRIPTION OF THE FIGURES

In order that the present invention may be better understood, embodiments thereof will now be described, by way of example only, with reference to the accompanying drawings, in which.

DETAILED DESCRIPTION OF EMBODIMENTS

Figure 1:
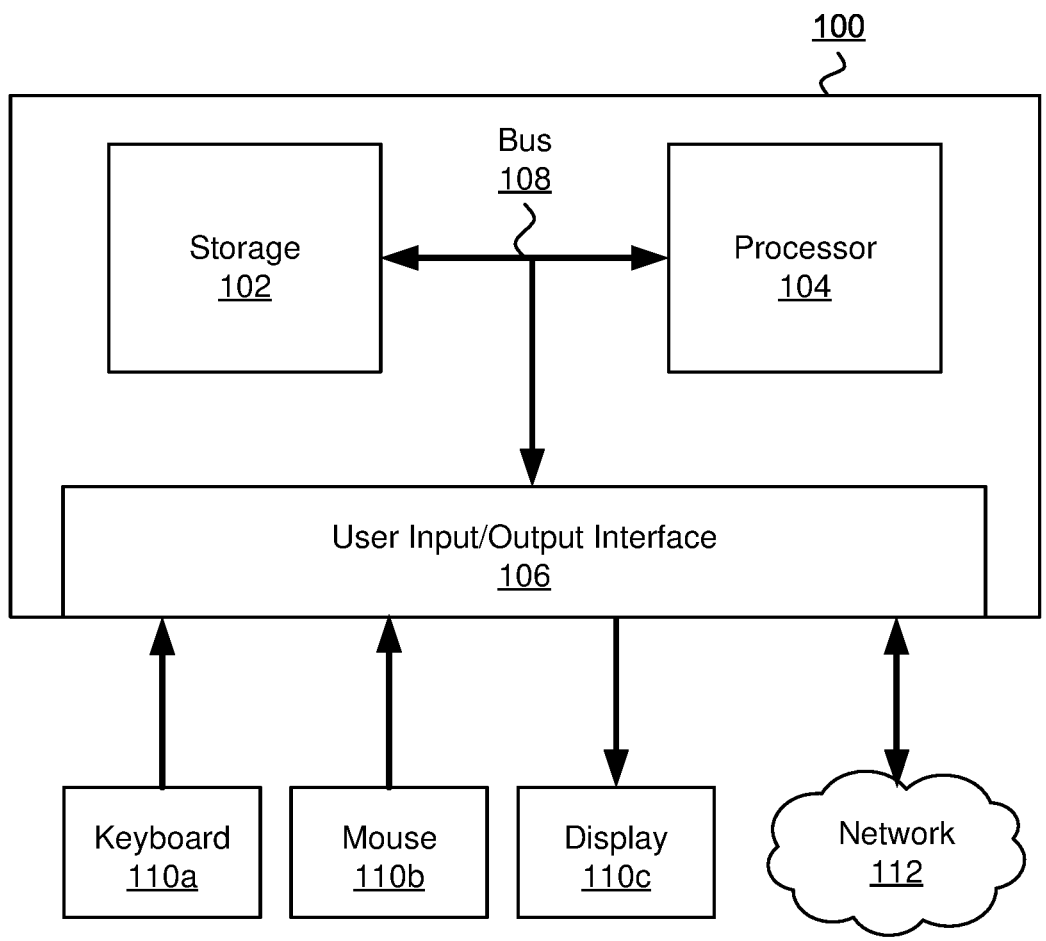
FIG. 1 is a block diagram of a computer system suitable for the operation of embodiments of the present invention.

FIG. 1 is a block diagram of a computer system 100 suitable for the operation of embodiments of the present invention. The system 100 comprises: a storage 102, a processor 104 and an input/output (I/O) interface 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage devices in the hierarchy providing differing capacities and response time, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs which, when executed by the processor 104, cause the processor 104 to carry out a method according to an embodiment of the invention, as discussed below (and accordingly configure the system 100 to be a system 100 according to an embodiment of the invention).

The input/output (I/O) interface 106 provides interfaces to devices 110 for the input or output of data, or for both the input and output of data. The devices 110 may include user input interfaces, such as a keyboard 110a or mouse 110b as well as user output interfaces, such as a display 110c. Other devices, such a touch screen monitor (not shown) may provide means for both inputting and outputting data. The input/output (I/O) interface 106 may additionally or alternatively enable the computer system 100 to communicate with other computer systems via one or more networks 112. It will be appreciated that there are many different types of I/O interface that may be used with computer system 100 and that, in some cases, computer system 100, may include more than one I/O interface. Furthermore, there are many different types of device 100 that may be used with computer system 100. The devices 110 that interface with the computer system 100 may vary considerably depending on the nature of the computer system 100 and may include devices not explicitly mentioned above, as would be apparent to the skilled person. For example, in some cases, computer system 100 may be a server without any connected user input/output devices. Such a server may receive data via a network 112, carry out processing according to the received data and provide the results of the processing via a network 112.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of: a personal computer; a laptop; a tablet; a mobile telephone (or smartphone); a television set (or set top box); a games console; an augmented/virtual reality headset; a server; or indeed any other computing device with sufficient computing resources to carry out a method according to this invention.

Figure 2:
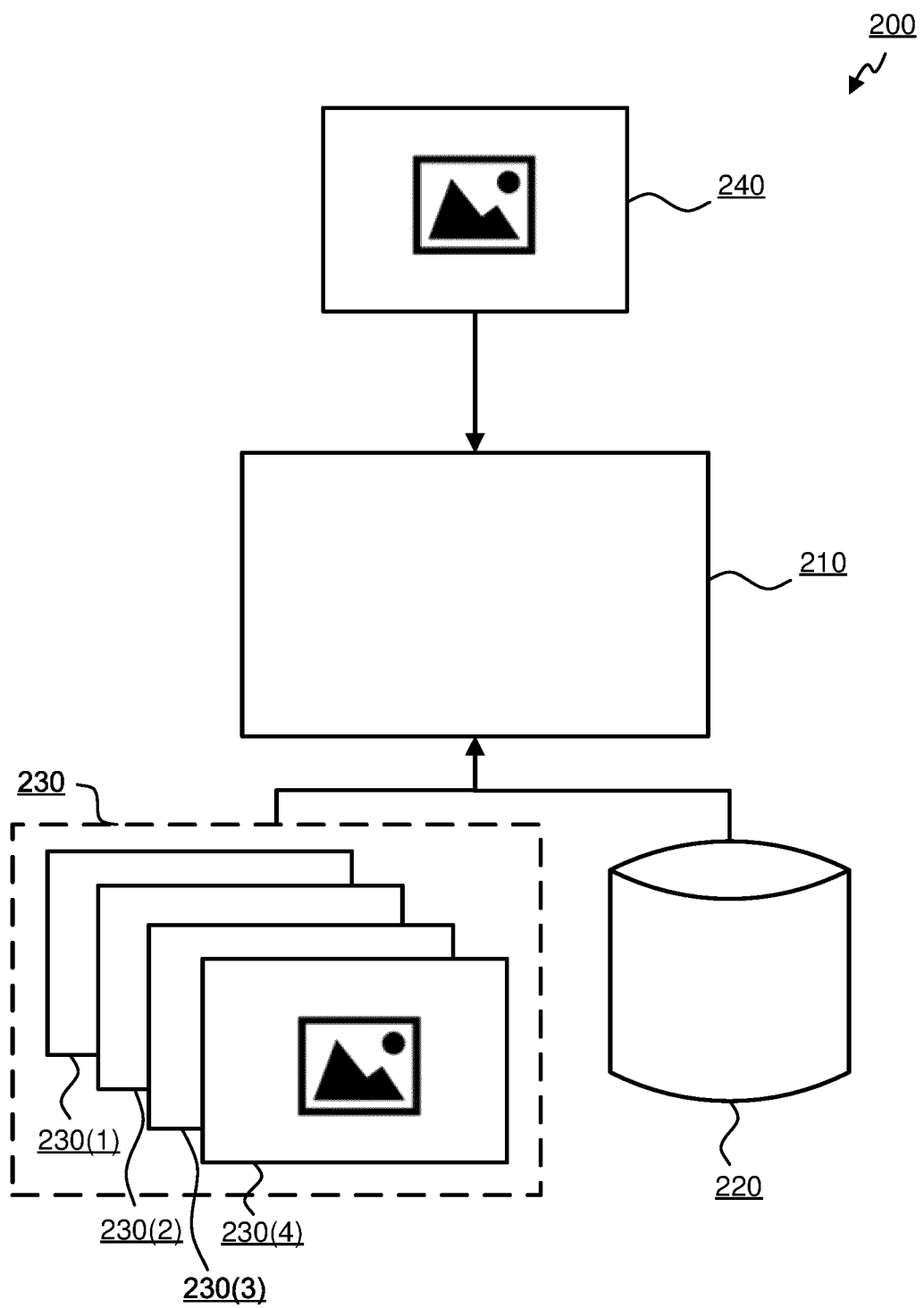
FIG. 2 is a block diagram of an exemplary image processing system according to the invention.

FIG. 2 is a block diagram of an exemplary image processing system 200 according to the invention. The image processing system 200 comprises an image processing unit 210, which is communicatively coupled to a database 220 and has access to a set (or repository) of images 230.

The image processing unit 210 is arranged to receive an image 240 containing a feature whose physical size is to be determined (also referred to herein as the input image). The image processing unit 210 may be implemented on any suitable type of computer system 100 which is able to carry out a method to be discussed below in more detail below in conjunction with FIG. 6. As will be appreciated by the skilled person, the computer system 100 on which the image processing unit is implemented may be dedicated to the task of carrying out the image processing according to this invention or may carry out other computational tasks in addition to doing so.

The database 220 stores data relating to the physical sizes of different types of object. The database 220 may reside on the same computer system 100 as the image processing unit or may be provided by a separate computer system 100. Furthermore, it will be appreciated that although a database is included in the exemplary system illustrated in FIG. 2, any other suitable way of making this data available to the image processing unit 210 (such as a web service which is configured to provide the data to image processing unit 210) may be used instead.

Figure 3:
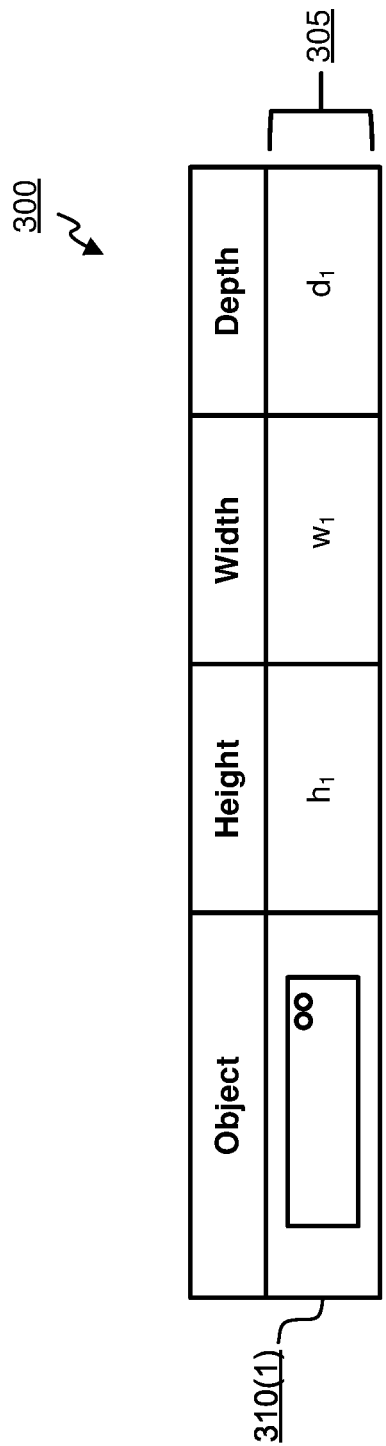
FIG. 3 shows a table that is populated with some exemplary initial data.

FIG. 3 shows a table 300 that is populated with some exemplary initial data 305, such as may be stored in database 220. This data is referred to herein as initial data 305 because it relates to the data that was already available prior to the processing according to this invention (or an iteration of such processing) being carried out. In the example illustrated in FIG. 3, the initial data 305 comprises data relating to a single known type of object 310(1). The data relating to this single known type of object 310(1) includes data to allow the type of object to be identified as well as an indication of its physical size. In the example illustrated in FIG. 3, the initial data 305 indicates a height $h_1$, width $w_1$ and depth dl for the known type of object 310(1). However, it will be appreciated that in some cases the invention may only be concerned with fewer dimensions, in which case table 300 may only record indications of the physical sizes in those dimensions. Similarly, only some dimensions of the known type of object 310(1) may be known, the other unknown dimensions may be recorded in a manner which indicates that they are unknown (such as by storing a null value).

The set of images 230 comprises images which are different from the input image 240 (and may therefore also be referred to herein as other images or reference images). These other images 230 may be made available to the image processing unit 210 in any appropriate manner, as will be understood by a person skilled in the art. For example, the set of images could be stored locally on the image processing unit 210 or otherwise accessed from remote storage, such as database 220 or from any other repository of images, which may or may not be cloud based, or provided to the image processing unit 210 in any other way. Indeed, the set of images 230 may represent a combined set of images 230 available from multiple different sources. Although FIG. 2 shows four images in the set of images 230, it will be appreciated that any number of images, including a single image, may be included in the set.

FIGS. 4A, 4B, 4C and 4D illustrate some exemplary images included in the set of other images 230. The set of other images 230 generally comprise representations of one or more types of object that are not already known. That is to say, there is an instance of at least one type of object represented in at least one of the other images 230 which is not included in the initial data 305 stored in the database 220 (and, in most cases, there will probably be many more).

Figure 4A:
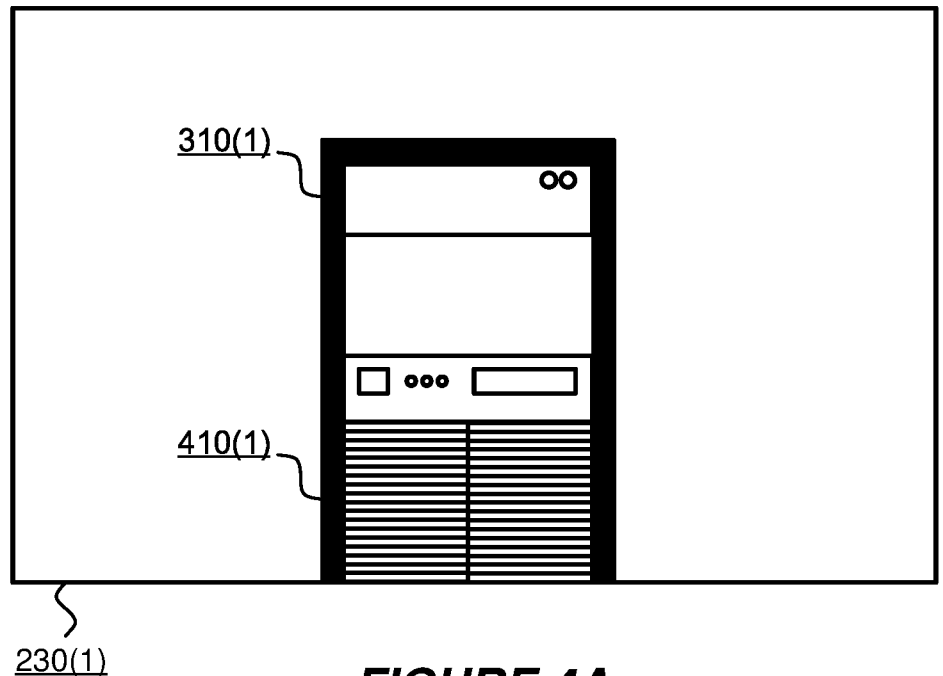
FIGS. 4A, 4B, 4C and 4D illustrate some exemplary images included in the set of other images.

In the first exemplary image 230(1) shown in FIG. 4A, there is a representation of a type of object 410(1) which is not yet known. There is also a representation of the object type 310(1) that is already known.

Figure 4B:
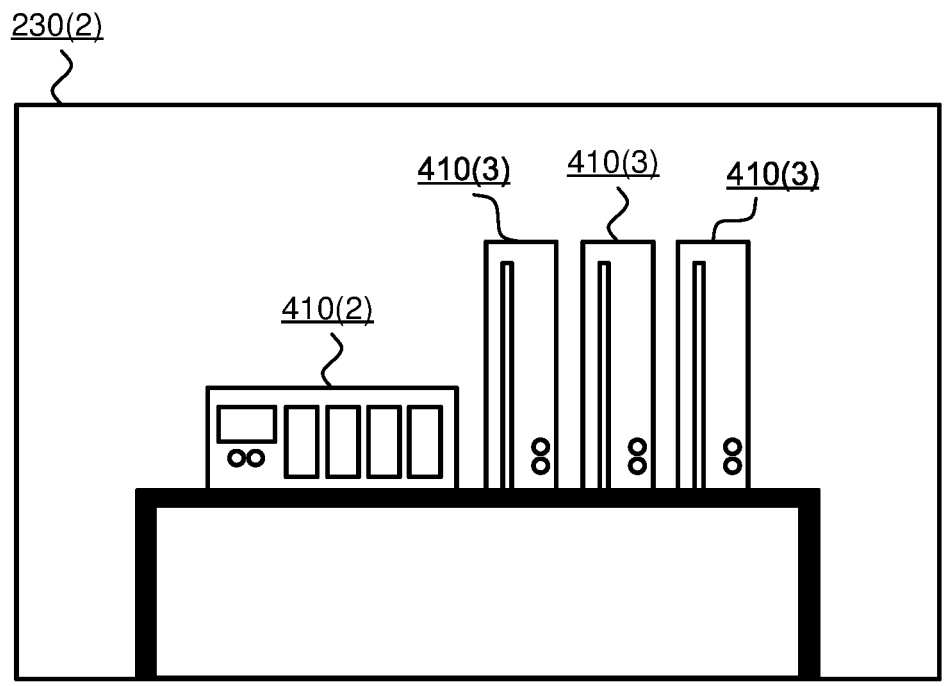

In the second exemplary image 230(2) shown in FIG. 4B, there are representations of two different types of unknown object, 410(2) and 410(3). There are not any representations of any objects of the type 310(1) that is already known.

Figure 4C:
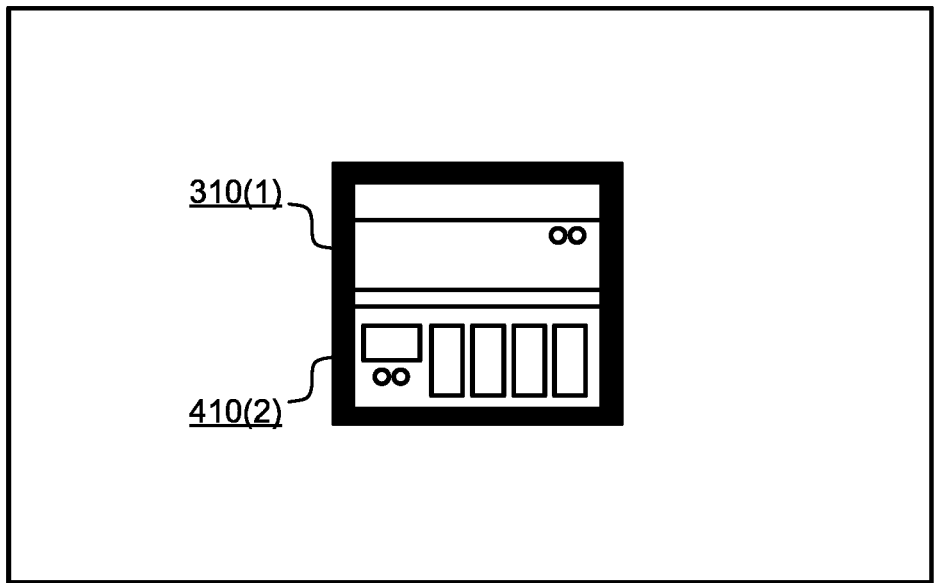

In the third exemplary image 230(3) shown in FIG. 4C, there is a representation of an unknown type of object 410(2). A representation of this unknown type of object is also present in the second exemplary image 230(2). Additionally, there is also a representation of the object type 310(1) that is already known.

Figure 4D:
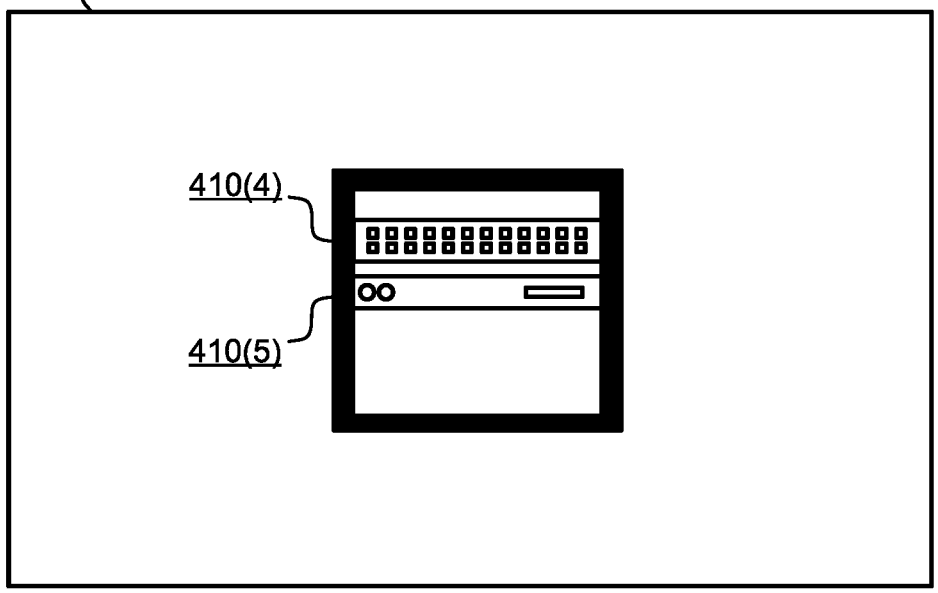

In the fourth exemplary image 230(4) shown in FIG. 4D, there are representations of two further types of object 410(4) and 410(5) that are not yet known. These two further types of object 410(4) and 410(5) do not appear in any of the other images 230. Additionally, there are not any representations of the type 310(1) that is already known.

Although the exemplary image processing system 200 that is illustrated in FIG. 2 is shown having access to a set of images 230 that consists of four images, it will be appreciated that any number of images can be included in the set 230. For example, the set of images 230 may, in the most simple of cases, contain a single image. However, in most cases the number of images in the set 230 will be much higher. Indeed, in some cases, the set of images 230 can be expected to grow over time, as will be discussed further below.

Figure 5:
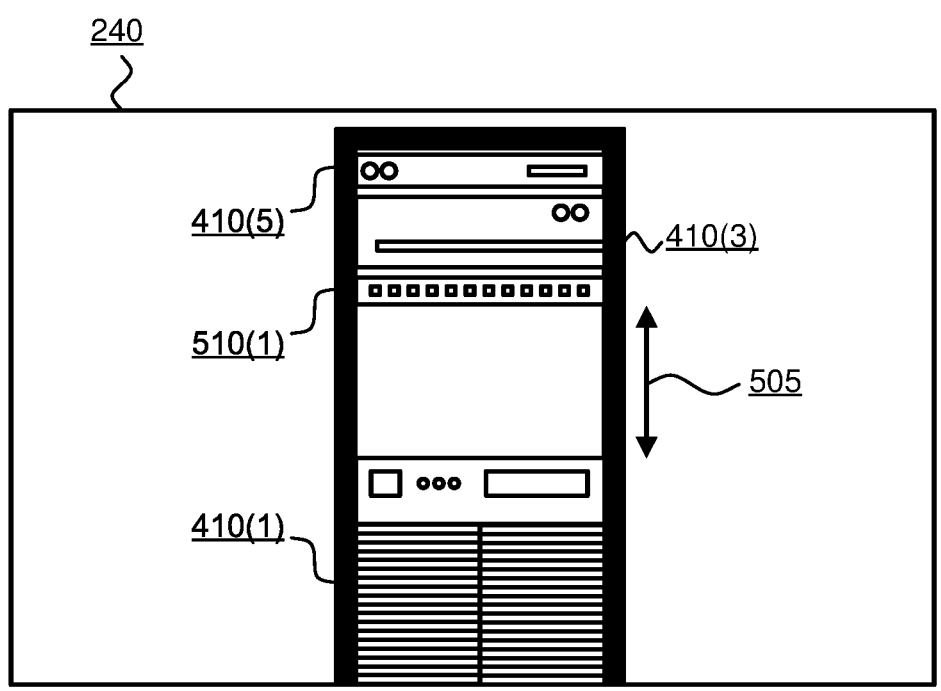
FIG. 5 illustrates an exemplary input image which is to be analysed by the image processing system to determine the size of a feature represented therein.

FIG. 5 illustrates an exemplary input image 240 which is to be analysed by the image processing system 200 to determine the size of a feature 505 represented therein. This exemplary input image 240 comprises representations of various types of object 410(1), 410(4), 410(5) which are also represented in the set of other images 230. The input image 240 does not contain any representations of the known type of object 310(1) included in the initial data 305. Additionally, the input image 240 includes a representation 510(1) of a type of object that is neither included in the initial data 305 nor represented in the set of images 230. In some cases, the feature 505 whose size is to be determined may be a dimension of an object in the image, for example, it may be desired to identify the physical size of the object 410(3). However, in other cases, the feature 505 may simply be an arbitrary distance between two points on the image, such as illustrated by the arrow in FIG. 5.

Figure 6:
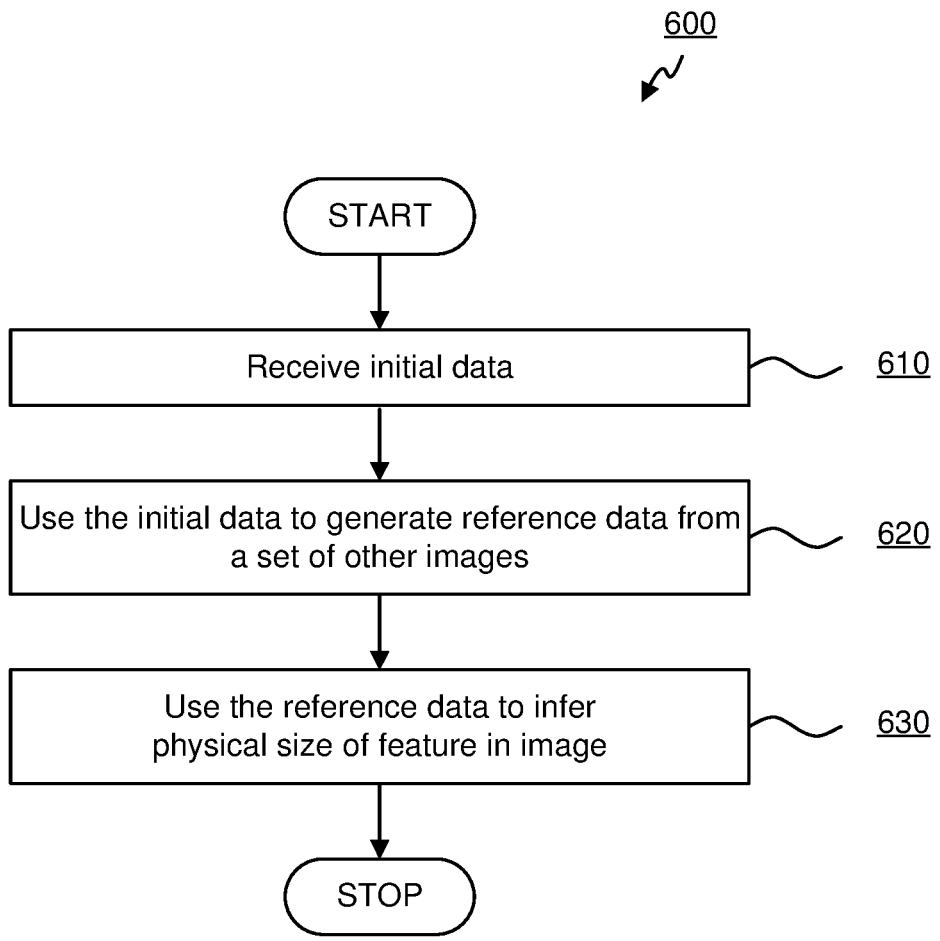
FIG. 6 is a flowchart illustrating a method for determining a physical size of a feature in an image according to the invention.

FIG. 6 is a flowchart illustrating a method 600 for determining a physical size of a feature in an image according to the invention. The method 600 is performed by the image processing unit 210 in order to determine the physical size of the feature 505 on the input image 240. The method begins at an operation 610.

At operation 610, the method 600 receives initial data 305 comprising an indication of a respective physical size of one or more known types of object. For example, this initial data 305 is available from the database 220. In this case, receiving the data comprises being provided with (or gaining) access to the database 220 without necessarily needing to transfer any data from the database 220. Alternatively or additionally, some initial data 305 may be explicitly provided in addition to the input image 240, in which case, the method 600 may store the initial data 305 in the database 220. The method 600 then proceeds to an operation 620.

At operation 620, the method 600 uses the initial data 610 to generate reference data from the set of other images 230. At operation 630, the reference data that is generated can then be used for sizing objects in an input image 240.

In general, this is achieved by identifying representations of new (i.e. previously unknown) types of objects in the one or more set of other images and using the initial data 305 to infer the sizes of those new types of objects from representations of known types of objects in the set of images 230. These new types of objects together with their respective inferred physical sizes collectively forming the reference data that is generated by operation 620. These new type of objects may also be referred to herein as reference types of objects to distinguish them from the known type of objects that were present in the initial data prior to operation 620 being performed.

To identify the representations of objects in an image, an image segmentation mechanism may be used together with an object recognition system. The image segmentation mechanism identifies regions of interest in the image which represent discrete objects and assigns them a unique identifier. An object recognition system can then be used to analyse the representation of each discrete object and assign it to a particular class. The class to which the representation of a discrete object is assigned may be an existing class if the discrete object corresponds to a type of object that has already been seen or to a new class if it does not. Accordingly, the class assigned to each region of interest corresponds to the type of the object represented in that region of interest. In some cases, these two activities can be carried out simultaneously by a single process. For example, a fully convolutional neural network (FCNN) may be used to simultaneous segment the image into discrete objects and classify those objects into classes. An example of how this may be implemented can be found, for example, in the paper "*Fully Convolutional Networks for Semantic Segmentation*" by Jonathan Long, Evan Shelhamer and Trever Darrel (available at https://people.eecs.berkeley.edu/~jonlong/long_shelhamer_fcn.pdf). However, there are many known image segmentation and object classification techniques that are known and, in general, any suitable combination of image segmentation and object classification techniques may be used instead to achieve the same outcome.

Turning to the exemplary images 230(1), 230(2), 230(3) and 230(4) illustrated in FIGS. 4A, 4B, 4C and 4D, the operation 620 may, for example, process each of the other images 230(1), 230(2), 230(3) and 230(4) in turn to identify and classify the representations of discrete objects within each image.

After processing the first image 230(1), for example, the operation 620 will have identified representations of two discrete objects. The first discrete object is already known and so is classified in the same class as the known type of object 310(1). The second discrete image has not been encountered before and so is classified in a new class representing a new type of object 410(1).

The operation 620 may then process the second image 230(2), following which, in this example, the operation 620 will have identified representations of four discrete objects. The first discrete object has not been encountered before and so is classified in a new class representing a new type of object 410(2). The second discrete object has also not been encountered before and so is classified in a new class representing a new type of object 410(3). The third and fourth discrete objects are identified as being the same type of object as the second discrete object and so are classified in the same new class 410(3).

The operation 620 may then process the third image 230(3), following which, in this example, the operation 620 will have identified representations of two discrete objects. The first discrete object is already known and so is classified in the same class as the known type of object 310(1). The second discrete object has also been encountered before in the second image 230(2) (even though it was not known prior to beginning the processing of operation 620) and so is assigned to the new class that was created for that type of object 410(2) when processing the second image 230(2).

The operation 620 may then process the fourth image 230(4), following which, in this example, the operation 620 will have identified representations of two discrete objects, neither of which have been encountered before and so are assigned to new classes representing the two new types of object 410(4) and 410(5).

Having identified at least some of the new types of objects that are represented in the set of other images 230(3) (i.e. as identified by the new classes that have been created), the operation infers physical sizes for the new types of objects either directly or indirectly from the initial data 305.

Where representations of a new type of object and a known type of object can be found in the same image, the physical size $p_n$ (e.g. in meters) of the new type of object may be directly inferred from the known type of object. This inference is based on the size of the representation of the new type of object in the image $r_n$ (e.g. in pixels), the size of the representation of the known type of object in the image $r_k$ (e.g. in pixels) and the physical size of the known type of object $p_k$ (e.g. in meters). From this information, it is possible to determine the physical size represented by each pixel (e.g. metres per pixel) based on the ratio between the size of the representation of the known type of object in the image $r_k$ and the physical size of the known type of object $p_k$, and therefore determine the physical size of the new type of object e.g.

$$p_n = \frac{r_n \times p_k}{r_k}$$

Returning to the earlier example discussed in relation to the exemplary images 230(1)-(4), both the first and third images 230(1) and 230(2) include representations of known types of object and newly identified types of object. Therefore, the operation 620 may use direct inference to infer physical sizes for the newly identified types of object from the known types of object. For example, the operation 620 may directly infer a size for the new type of object 410(1) represented in the first image 230(1) based on the sizes of the representations of the new type of object 410(1) and the known type of object 310(1) in the first image 230(1), as well as the physical size of the known type of object 310(1) indicated by the initial data 305. Similarly, the operation 620 may directly infer a size for the new type of object 410(2) represented in the third image 230(3) based on the sizes of the representations of the new type of object 410(2) and the known type of object 310(1) in the third image 230(1), as well as the physical size of the known type of object 310(1) indicated by the initial data 305.

Even where some images of the set other images 230 do not contain any representations of known types of object (that is types of objects for which a physical size is indicated in the initial data), it may still be possible to indirectly infer a physical size for new types of object represented in such images. This is achieved by using the inferred physical sizes for the reference objects that have been detected in others images in the set of images 230. That is to say, where an image includes a representation of a reference object for which a physical size has already been inferred from another image, it is possible to use that inferred physical size to indirectly infer the physical sizes of the other types of object represented in the image. Such reference objects may be referred to as intermediate objects (or intermediate types of objects), as they are used to perform an intermediate inference between the objects represented in separate images of the set of other images 230, allowing the indirect inference of the size of an object type represented in one image based on a representation of a known type of object in another image. It will be appreciated that the technique for doing so is the same as that used for direct inference, but instead of using the size of a representation of a known type of object in the image $r_k$, the size of a representation of the reference type of object in the image $r_r$ is used, and instead of using the physical size of the known type of object $p_k$, the inferred physical size of the representation of the reference type of object $p_r$ is used, i.e.

$$p_n = \frac{r_n \times p_r}{r_r}$$

Returning to the earlier example discussed in relation to the exemplary images 230(1)-(4), the second image 230(2) does not include any representations of known types of object and so the sizes of the new types of object 410(2) and 410(3) represented in the second image 230(2) cannot be directly inferred. However, as discussed above, a physical size for one of the new types of object 410(2) represented in the second image 230(2) can be directly inferred from the third image 230(3). Therefore, this new type of object 410(2) can be used as an intermediate reference object to indirectly infer the physical size of the other new type of object 410(3) represented in the second image 230(2). The operation 620 may therefore indirectly infer the physical size of the new type of object 410(3) based on the size of the representations of the reference type of object 410(2) and the new type of object 410(3) in the second image 230(2) and the physical size of the reference type of object 410(2) that was directly inferred from the third image 230(3).

It will be appreciated that, whilst not illustrated in the exemplary images 230(1)-(4), a new type of object for which a physical size has been indirectly inferred may itself be used as an intermediate reference type of object for further indirectly inferring the physical sizes of other types of object.

The operation 620 may store the generated reference data in the database 220.

Figure 7:
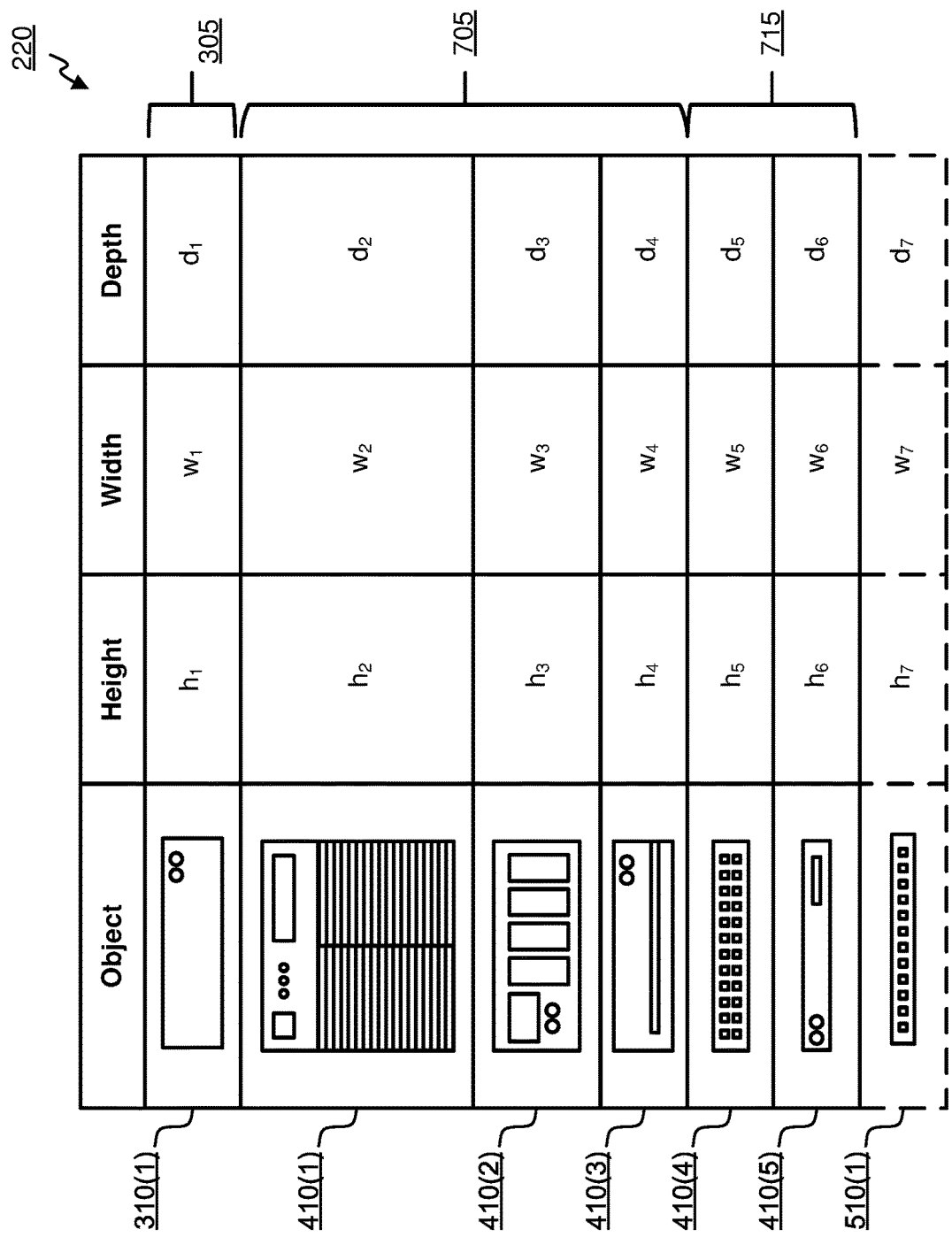
FIG. 7 shows the table of FIG. 3 in which the initial data has been augmented with generated reference data.

FIG. 7 shows the table of FIG. 3 in which the initial data 305 has been augmented with generated reference data 705. That is to say, in addition to the record for the known type of object 310(1) that was indicated in the initial data 305, new records for the new types of object 410(1), 410(2) and 410(3) have been added, which collectively form the reference data 705 generated by operation 620. The inferred height $h_n$, width $w_n$ and depth $d_n$ dimensions for each new type of object may be recorded. Again, it will be appreciated that where the invention is concerned with fewer dimensions, only those dimensions of interest may be inferred and stored for the new types of object. Whilst it is convenient to store the generated reference data 705 together with the initial data 305 (as together they represent a set of data which can be used to infer physical sizes of objects in images), it will be appreciated that this need not necessarily be the case and the generated reference data 410 may be stored in any other suitable manner either together with or separately from the initial data 305.

The operation 620 may also store records 715 for new types of object that have been detected but for which no physical size can yet be inferred. For example, it is not possible, at this stage, for operation 620 to infer physical sizes for the new types of object 410(4) and 410(5) represented in the fourth image 230(4) because there are no representations of any known objects from which a physical size could be directly inferred, nor are there any representations of any reference objects 410(1), 410(2), 410(3) from which a physical size could be indirectly inferred. The physical size for these types of object 410(4) and 410(5) may be recorded in a manner that indicates that they are not known (such as by storing a null value for each dimension).

Such records 715 act as placeholders for these new types of objects allowing the image processing unit 210 to identify new types of objects that have already been encountered in the set of reference images 230, as will be discussed further below. Again, although it may be useful to store such records 715 to aid in future processing, it will be appreciated that it is not necessary to do so.

Having generated the reference data at operation 620, the method proceeds to an operation 630.

At operation 630, the method 600 uses the reference data 705 to determine the physical size of the feature 505 in the input image 240. To achieve this, at operation 630, the method 600 analyses the input image to identify and classify the representations of discrete objects in the input image 240. This can be done in the same way as discussed above in relation to the analysis of the set of other images 230. The method 600 then determines whether any of the identified objects belong to the same class (i.e. are of the same type) as the reference objects identified in the reference data 705.

The representation of a reference type of object in the input image 240 can be used to infer a physical size of the feature 505 in much the same way as discussed above in relation to the analysis of the set of other images 230. In particular, the inference is based on the sizes of the representations of the feature 505 $r_f$ and the reference type of object in the image (e.g. in pixels) $r_r$ and the inferred physical size of the reference type of object (e.g. in metres) $p_r$ as indicated in the reference data 705. Again, from this information, it is possible to determine the physical size represented by each pixel (e.g. metres per pixel) based on the ratio between the size of the representation of the reference type of object in the image $r_r$ and the physical size of the reference type of object $p_r$, and to then use this to determine the physical size of the feature 505 $p_f$ e.g.

$$p_f = \frac{r_f \times p_r}{r_r}$$

For example, when processing the exemplary input image 240 illustrated in FIG. 5, the operation 630 identifies representations of four discrete objects 410(1), 410(3), 410(5) and 510(1) in the input image 240. Two of these discrete objects 410(1) and 410(3) are types of object that are included in the reference data 705 and so may be used as reference objects for determining the physical size of the feature 505 in the input image 240. As discussed above, a physical size for the first type of possible reference object 410(1) was directly inferred during operation 620 from a representation of the known type of object 310(1) in the first reference image 230(1). Meanwhile, the physical size for the second type of possible reference object 410(3) was indirectly inferred from the second image 230(2) during operation 620 from a representation of the known type of object 310(1) in the third image 230(3) using object type 410(2) as an intermediate reference object (since it appears in both images). Accordingly, the method 600 may determine a size of the feature 505 using either object type 410(1) or object type 410(3).

It will be appreciated that the physical size of the feature 505 determined using this method 600 may be subject to a certain level of inaccuracy. Two possible sources of such inaccuracy include: (a) introduction of discretization errors resulting from the representation of the objects in pixels in the image; and (b) differences in the depths of the different representations of the objects in the image. Whilst the accuracy that can be achieved by method 600 may be suitable for some applications, it may be desirable to help reduce the errors that are introduced into the inferred physical sizes of both the reference types of objects in the reference data 705 and the feature 505 in the input image.

Accordingly, in some cases, inferring the physical size of a type of object (either a reference type of object or a feature in the input image 240) may involve inferring a plurality of candidate physical sizes for the type of object and determining a physical size for the type of object based on the plurality of candidate physical sizes. It will be appreciated from the above description that there are likely to be a number of different ways in which a physical size for a particular type of object (or feature) can be inferred. As examples, any combination of the following techniques may be employed to infer multiple candidate physical sizes:

a) where the particular type of object is represented in multiple images of the set of images, a respective candidate size for the type of object can be inferred from each such image (either directly or indirectly);

b) where multiple representations of the particular type of object is represented in a single image, a respective candidate size for the type of object can be inferred from each such representation (either directly or indirectly);

c) where multiple representations of the same known type of object or reference type of object are present in an image, a respective candidate size may be inferred from each representation; and/or d) where multiple different types of known type of object and/or reference type of object are represented in an image, a respective candidate size may be inferred separately from each type of object.

In any case, having obtained a plurality of candidate physical sizes for a type of object (or feature), there are many different ways that they can be used to provide a more accurate indication of the size of a type of object (or feature), as will be appreciated by the skilled person. For example, the candidate physical sizes may be averaged, such as by taking the mean or the mode of the inferred physical sizes for the type of object.

In some cases, it may be desirable to provide an indication of the accuracy of an inferred physical size for a type of object (or feature). Accordingly, a range of physical sizes for a type of object (or feature) may be determined from the plurality of candidate physical sizes that have been inferred. As will be appreciated, the range may be based on particular percentiles of the inferred candidate physical sizes (such as the $10^{th}$-$90^{th}$, $20^{th}$-$80^{th}$ or $25^{th}$-$75^{th}$ percentiles) so as to exclude outliers.

Alternatively, or additionally, an indication of the confidence of the inferred size may be provided. This may be based, for example, on a number of different candidate physical sizes that have been used to infer the size and/or on a number of different images (or number different representations within or more images) upon which the size has been inferred from, and/or the number of different reference objects used to determine the measurement and the variance or confidence of the physical size for those objects. For example, where the mode of the candidate physical sizes is used as the inferred physical size, the confidence value can be based on the number of candidate physical sizes that provided that value. However, it will be appreciated that any suitable way of deriving a confidence value that indicates a confidence in the accuracy of a measurement may be used.

The set of reference images 230 may be added to over time, such that new images are available to be analysed for reference data. For example, the input image 240 may be added to the set of reference images 230 after it has been processed by the method 600. Other additional reference images may be added to the set 230 without having been used as an input image 240 for the method 600. Similarly, new initial data 305 may be stored in the database 220 (in this sense, the new initial data may be considered to be data about the physical sizes of types of object that was derived by means other than inference from the set of images 240, such by as a user providing a physical measurement of a type of object). Accordingly, the method 600 may be performed iteratively (either periodically or in response to a change in the set of reference images 230 or initial data 305). By performing the method 600 iteratively, the method 600 can augment and/or refine the reference data 705 that has been generated by previous iterations, thereby generating updated reference data.

For example, following the above-described iteration of method 600, the exemplary input image 240 illustrated in FIG. 5 may be added to the set of reference images 230. Accordingly, in a subsequent iteration of the method 600, the method 600 may identify the discrete objects represented in the newly added reference image 240 as being of four different types, namely two types of object 410(1) and 410(3) that are already known from the previously generated reference data 705, a type of object 410(5) that has already been encountered in the fourth image 230(4) but not added to the reference data 705 due to it not being possible to infer a physical size during the previous iteration, and a new type of object 510(1) that has not been previously encountered. A physical size for the types of object 410(5) and 510(1) that were not already in the reference data 705 can be inferred, for example from the representations of reference type of object 410(1) and/or 410(3). This also means that the physical size of the previously encountered type of object 410(4) can also now be indirectly inferred from the fourth image 230(4) by using object type 410(5) as an intermediate reference type of object. Accordingly, in this subsequent iteration of the method 600, the reference data 705 is updated to include new reference types of object 410(4), 410(5) and 510(1).

Where the determined physical size of the reference types of objects is based on a plurality of candidate inferred physical sizes, the method 600 may also refine the previously determined physical sizes for previously identified reference types of objects. In particular, the inclusion of the new image 240 in the set of reference images 230 provides new ways of inferring additional candidate physical sizes for the pre-existing reference types of objects. For example, candidate physical size of the first type of reference object 410(1) can now additionally be inferred from the new image 240 using reference object 410(3). An additional candidate physical size can also be inferred from intermediate reference object 410(3) using the representation of that type of object 410(3) and the reference object 410(2) in the second image 230(2). By recording sufficient information in the database, such as by keeping a record of all previously inferred physical candidate sizes used to determine the physical size of a reference type of object, it is possible to update the physical size for a reference type of object based on the newly available information (e.g. the new ways of generating candidate physical sizes for that reference type of object from the enlarged set of reference images 230).

Whilst the above described mechanisms can help improve the accuracy of the measurements that are provided by the invention (or at least convey the accuracy with which measurement has been determined), additional measures may also be deployed in order to further reduce some potential inaccuracies that may be caused due to differences in the depths of the different representations of the objects in the image. For example, the set of reference images may be selected to be relatively planar (i.e. with minimal variations in depth), as is the case with the example that will be discussed in relation to FIG. 7. However, where this is not the case, the method 600 may filter out any images which exhibit too great a range of depths. In particular, the method 600 may identify multiple different representations of known and/or reference types of object in an image and use the ratio of the size of each representation to the physical size of the associated object type as an indication of depth. Therefore, if the variation of the ratios for each of the representations of known and/or reference types of object in an image is too great (e.g. if it exceeds a pre-determined threshold), the method 600 may ignore that image and not use it for generating reference data 705. Even if the variation of the ratios is not too great, the method 600 may, in some cases, ignore the representations of objects which are associated with ratios that are too different from the others represented in the image (e.g. a variance from the mean is above a predetermined threshold or number of standard deviations), such that those representations are not used for inferring physical sizes of object types. Additionally, or alternatively, the method 600 may only use representations of objects that are within a certain distance (e.g. predetermined number of pixels, or proportion of the overall size of the image, or distance in metres by using the ratio of a representation of a known or reference type of object and its physical size to determine a number of pixels that correspond to that distance, or that are overlay another type of object detected in the image, such as the cabinet discussed further below in relation to FIG. 7). Whilst these techniques may help to reduce some potential inaccuracies that may be caused due to differences in the depths of the different representations of the objects in the image, it will be appreciated that even in the absence of such techniques, the invention can still operate to determine a range of possible measurements for such objects that can be refined based on different representations in the set of reference images 230.

Having determined the size of the physical feature 505 in the input image 240, this may be provided as a result directly to a user of the system. However, it will also be appreciated that the determined size may also be provided for use by other systems. Similarly, the image processing system 200 itself may make further use of the determined size to make further determinations about other properties of the input image 240 or the objects represented in it.

It will be appreciated that the examples used in the discussion of the invention so far have been simplified in order to more clearly convey its operation. A more complex example will now be discussed to further illustrate an application of the invention.

Figure 8A:
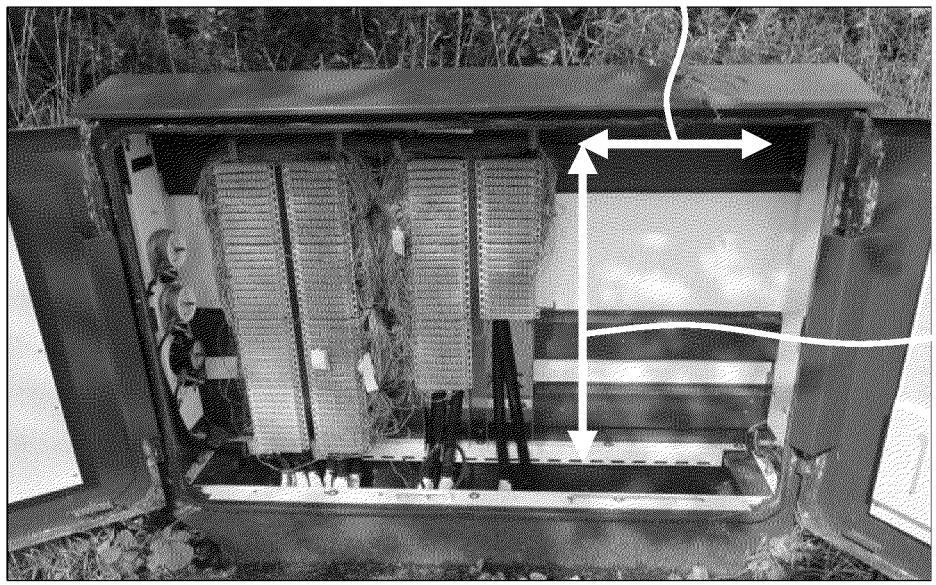
FIGS. 8A and 8B show exemplary images that may be used in one exemplary application of the invention.
Figure 8B:
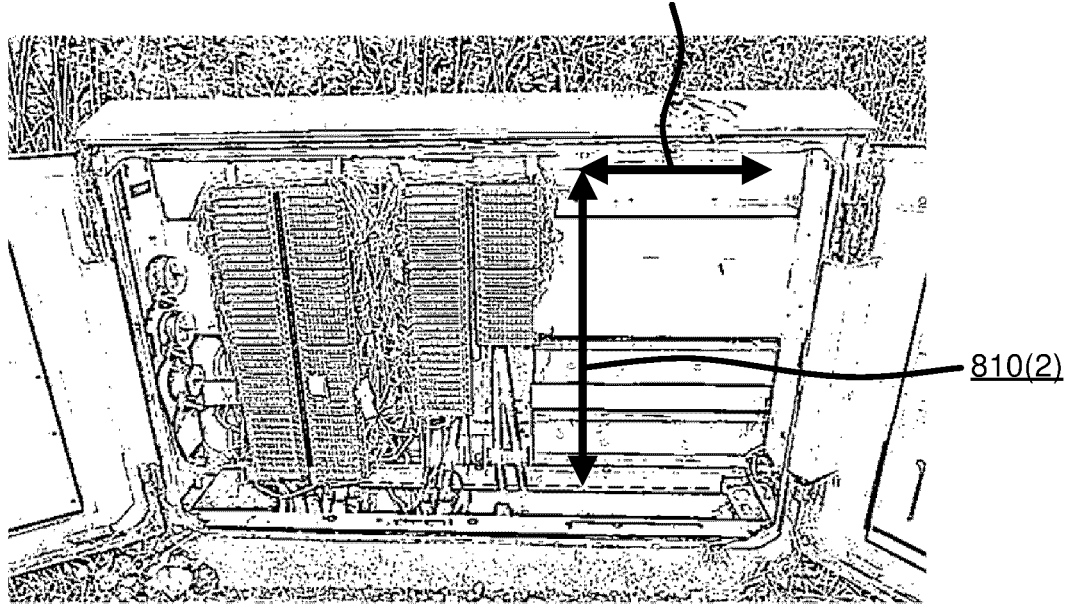

FIGS. 8A and 8B show exemplary images that may be used in one exemplary application of the invention. In particular, FIG. 8A shows a photograph of a Primary Connection Point (PCP) cabinet which contains equipment for enabling broadband connections to end customers. In the UK, there are roughly 100,000 such cabinets that have been deployed over time as the network has been installed and upgraded. There may be many different types of such cabinets in a network, with a wide range of different types and quantity of equipment deployed within each of them. Operators looking to upgrade or expand such networks ideally seek to make use of existing cabinets for installing new equipment, rather than installing new cabinets specifically for that purpose, in order to prevent delay and reduce costs. However, it can be hard to know how much space is currently available for expansion (e.g. how many more connectors could be installed) within the existing cabinets and whether (or when) new cabinets will be required. This is especially true when dealing with a large network in which many cabinets are available. Of course, one approach could be to carry out inspections to survey the amount of available space, however this is likely to be a relatively slow and expensive process. The operator may have a library of photographs of the cabinets available, similar to that shown in FIG. 8A, which may, for example, have resulted from photographs being taken when work was last undertaken on a cabinet. Although these photographs were not taken with the goal of determining measurements in mind, and so will typically not include pre-determined reference objects that have been included nor capture any additional meta information required for this purpose, this invention can be deployed in order to answer this question. For example, to work out the spare space in the cabinet in the photograph shown in FIG. 8A, a user may use system 200 to determine the physical size of the available space in the cabinet by determining the measurements indicated by the arrows 810(1) and 810(2). The system 200 can be provided with some initial data 305, such as the known sizes of some commonly used cabinets or components within cabinets, such as connectors. The system 200 can use this initial data 305 to generate reference data from the collection of photos. The generated reference data may include for example, inferred sizes of other types of cabinets or components within cabinets, such as connectors. Then, for any given photograph, this reference data can be used to infer the measurements 810(1) and 810(2) and determine the amount of available space within a cabinet. It will be appreciated that, in some cases, the set of images 240 may be a set of pre-processed images generated from the photographs. The pre-processing may assist in the object detection to be performed by the system 200 (although equally, this processing may be performed by system 200 itself as part of its processing). For example, FIG. 8B shows the photograph shown in FIG. 8A that has been processed by an edge detection algorithm.

Although an exemplary application of this invention has been discussed in relation to capacity management within network cabinets, it will be appreciated that the invention may be equally applied in any other application where it is desired to infer distances or dimensions within an image. In particular, the present invention allows sizes to be inferred in images which were not taken with the intention of allowing such inference to be made, such as historically captured images which were taken for some other purpose. That is to say, the invention does not require any pre-determined specific object to be included in an image, nor does it require the image capture device to have been pre-calibrated to capture additional metadata for the image. Instead, the invention provides a way of measuring features in images which makes use of a set of reference images to extract (or learn) reference information that can be used for this purpose. When applied iteratively, the accuracy of (and/or confidence in) this reference data can be improved, which can in turn improve the accuracy of (and/or confidence in) the measurements that are provided. Furthermore, if the set of reference images is added to over time, the invention can adapt to learn about new types of object.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention described herein also relates to the following aspects:

1. A computer implemented method for determining a physical size of a feature represented in an image, the method comprising:
   receiving initial data comprising an indication of a respective physical size of one or more known types of object;
   using the initial data to generate reference data from a first reference image, the reference data comprising an indication of a respective inferred physical size of one or more reference types of object; and
   using the reference data to determine the physical size of the feature based, at least in part, on:
      a size of a representation of one of the reference types of object in the image;
      the inferred physical size of that reference type of object; and
      a size of the representation of the feature in the image.

2. The method of aspect 1, wherein generating the reference data comprises directly inferring a physical size of at least one of the reference types of object from a respective one of the known types of object based on:
   a size of a representation of the reference type of object in the first reference image;
   a size of a representation of the known type of object in the first reference image; and
   the physical size of the known type of object as indicated by the initial data.

3. The method of aspect 1 or aspect 2, wherein the first reference image is one of a set of reference images and generating the reference data comprises indirectly inferring a physical size of at least one of the reference types of object from a respective one of the known types of object based on:
   a size of a representation of the reference type of object in the first reference image;
   a size of a representation of an intermediate type of object in the first reference image;
   a size of a representation of the intermediate type of object in a second image of the set of reference images;
   a size of a representation of the known type of object in the second image; and
   the physical size of the known type of object as indicated by the initial data.

4. The method of aspect 2 or aspect 3, wherein generating the reference data comprises determining a respective plurality of candidate physical sizes for at least one of the reference types of object and determining a respective inferred physical size for the reference type of object based on the plurality of candidate physical sizes.

5. The method of aspect 4, wherein a plurality of the respective candidate physical sizes for the reference type of object are inferred from different representations of a known type of object.

6. The method of aspect 4 or aspect 5 when dependent on aspect 4, wherein the respective plurality of candidate physical sizes comprise at least one directly inferred physical size and at least one indirectly inferred physical size.

7. The method of any one of aspects 4 to 6 when dependent on aspect 3, wherein a plurality of the respective candidate physical sizes are indirectly inferred from the same representation of a known type of object based on different representations of the intermediate type of object in either the first reference image, the second reference image, or both the first and second reference image.

8. The method of any one of aspects 4 to 7 when dependent on aspect 3, wherein a plurality of the respective candidate physical sizes are indirectly inferred from the same representation of a known type of object based on representations of different intermediate types of object in the first and second reference images.

9. The method of any one of aspects 4 to 8, wherein:
   the initial data comprises an indication of a respective physical size of a plurality of known types of object; and
      a plurality of the respective candidate physical sizes are inferred either directly or indirectly from respective representations of each of the plurality of known types of object.

10. The method of any one of the preceding aspects, wherein:
   the inferred physical size of the one or more reference types of object comprises an indication of a range of physical sizes; and
   the determined physical size of the feature comprises an indication of a range of physical sizes.

11. The method of any one of the preceding aspects, further comprising determining a respective confidence with the inferred physical size of each of the one or more reference types and providing an indication of a respective confidence in the inferred physical size of the feature.

12. The method of any one of the preceding aspects, wherein the reference data is generated iteratively from the reference images, wherein each subsequent iteration either increases the number of reference type of objects in the reference data or refines the inferred physical sizes for one or more reference type of objects in the reference data, or both.

13. The method of any one of the preceding aspects, wherein the method further comprises storing the image as a reference image to be used in determining a physical size of a feature represented in a further image.

14. A computer system comprising a processor and a memory storing computer program code for performing the steps of any one of the preceding aspects.

15. A computer program which, when executed by one or more processors, is arranged to carry out a method according to any one of aspects 1 to 13.

The invention claimed is:

1. A computer implemented method for determining a physical size of a feature represented in an image, the method comprising:
   receiving initial data comprising data for identifying one or more known types of object and an indication of a respective physical size of each of the one or more known types of object;
   generating reference data from a first reference image by identifying one or more new types of object represented in the first reference image and using the initial data to infer a respective physical size of each of the one or more new types of object, the one or more new types of object forming one or more reference types of object for determining the physical size of the feature; and
   using the reference data to determine the physical size of the feature based, at least in part, on:
      a size of a representation of one of the reference types of object in the image;
      the inferred physical size of that reference type of object; and
      a size of the representation of the feature in the image.

2. The method of claim 1, wherein generating the reference data comprises directly inferring a physical size of at least one of the reference types of object from a respective one of the known types of object based on:
   a size of a representation of the reference type of object in the first reference image;
   a size of a representation of the known type of object in the first reference image; and
   the physical size of the known type of object as indicated by the initial data.

3. The method of claim 2, wherein generating the reference data comprises determining a respective plurality of candidate physical sizes for at least one of the reference types of object and determining a respective inferred physical size for the reference type of object based on the plurality of candidate physical sizes.

4. The method of claim 3, wherein a plurality of the respective candidate physical sizes for the reference type of object are inferred from different representations of a known type of object.

5. The method of claim 3, wherein the respective plurality of candidate physical sizes comprise at least one directly inferred physical size and at least one indirectly inferred physical size.

6. The method of claim 3, wherein:
   the initial data comprises an indication of a respective physical size of a plurality of known types of object; and
   a plurality of the respective candidate physical sizes are inferred either directly or indirectly from respective representations of each of the plurality of known types of object.

7. The method of claim 1, wherein the first reference image is one of a set of reference images and generating the reference data comprises indirectly inferring a physical size of at least one of the reference types of object from a respective one of the known types of object based on:
   a size of a representation of the reference type of object in the first reference image;
   a size of a representation of an intermediate type of object in the first reference image;
   a size of a representation of the intermediate type of object in a second image of the set of reference images;
   a size of a representation of the known type of object in the second image; and
   the physical size of the known type of object as indicated by the initial data.

8. The method of claim 1,
   wherein the first reference image is one of a set of reference images and generating the reference data comprises indirectly inferring a physical size of at least one of the reference types of object from a respective one of the known types of object based on;
   a size of a representation of the reference type of object in the first reference image;
   a size of a representation of an intermediate type of object in the first reference image;
   a size of a representation of the intermediate type of object in a second image of the set of reference images;
   a size of a representation of the known type of object in the second image;
   the physical size of the known type of object as indicated by the initial data; and
   wherein generating the reference data comprises determining a respective plurality of candidate physical sizes for at least one of the reference types of object and determining a respective inferred physical size for the reference type of object based on the plurality of candidate physical sizes;
   wherein a plurality of the respective candidate physical sizes are indirectly inferred from the same representation of a known type of object based on different representations of the intermediate type of object in either the first reference image, the second reference image, or both the first and second reference image.

9. The method of claim 1,
   wherein the first reference image is one of a set of reference images and generating the reference data comprises indirectly inferring a physical size of at least one of the reference types of object from a respective one of the known types of object based on:
   a size of a representation of the reference type of object in the first reference image;
   a size of a representation of an intermediate type of object in the first reference image;
   a size of a representation of the intermediate type of object in a second image of the set of reference images;
   a size of a representation of the known type of object in the second image;
   the physical size of the known type of object as indicated by the initial data;
   wherein generating the reference data comprises determining a respective plurality of candidate physical sizes for at least one of the reference types of object and determining a respective inferred physical size for the reference type of object based on the plurality of candidate physical sizes; and
   wherein a plurality of the respective candidate physical sizes are indirectly inferred from the same representation of a known type of object based on representations of different intermediate types of object in the first and second reference images.

10. The method of claim 1, wherein:
   the inferred physical size of the one or more reference types of object comprises an indication of a range of physical sizes; and the determined physical size of the feature comprises an indication of a range of physical sizes.

11. The method of claim 1, further comprising determining a respective confidence with the inferred physical size of each of the one or more reference types and providing an indication of a respective confidence in the inferred physical size of the feature.

12. The method of claim 1, wherein the reference data is generated iteratively from the reference images, wherein each subsequent iteration either increases the number of reference type of objects in the reference data or refines the inferred physical sizes for one or more reference type of objects in the reference data, or both.

13. The method of claim 1, wherein the method further comprises storing the image as a reference image to be used in determining a physical size of a feature represented in a further image.

14. A non-transitory computer-readable storage medium storing computer program code which, when executed by one or more processors, is arranged to carry out a method according to claim 1.

15. The method of claim 1, wherein the image having the feature represented therein does not contain any representation of the one or more known types of object.

16. A computer system for determining a physical size of a feature represented in an image, the computer system comprising a processor and a memory storing computer program code, wherein upon execution of the comp ter code by the processor, the computer system is at least configured to:
　receive initial data comprising data for identifying one or more known types of object and an indication of a respective physical size of each of the one or more known types of object;
　generate reference data from a first reference image by identifying one or more new types of object represented in the first reference image and use the initial data to infer a respective physical size of each of the one or more new types of object, the one or more new types of object forming one or more reference types of object for determining the physical size of the feature; and
　use the reference data to determin be physical size of the feature based, at least in part. on:
　　a size of a representation of one of the reference types of object in the image;
　　the inferred physical size of that reference type of object; and
　　a size of the representation of the feature in the image.

17. The computer system of claim 16, wherein the image having the feature represented therein does not contain any representation of the one or more known types of object.

18. The computer system of claim 16, wherein the generation of the reference data comprises directly inferring a physical size of at least one of the reference types of object from a respective one of the known types of object based on:
　a size of a representation of the reference type of object in the first reference image;
　a size of a representation of the known type of object in the first reference image; and
　the physical size of the known type of object as indicated by the initial data.

19. The computer system of claim 18, wherein in order to generate the reference data, the computer system is further configured to determine a respective plurality of candidate physical sizes for at least one of the reference types of object and determine a respective inferred physical size for the reference type of object based on the plurality of candidate physical sizes.

20. The computer system of claim 19, wherein a plurality of the respective candidate physical sizes for the reference type of object are inferred from different representations of a known type of object.

21. The computer system of claim 19, wherein the respective plurality of candidate physical sizes comprise at least one directly inferred physical size and at least one indirectly inferred physical size.

* * * * *